United States Patent
Bishop et al.

[15] 3,638,138
[45] Jan. 25, 1972

[54] CADMIUM PHOSPHIDE LASER

[72] Inventors: Stephen G. Bishop, Arlington, Va.; William J. Moore, Greenbelt, Md.; Edward M. Swiggard, Alexandria, Va.

[73] Assignee: The United States of America as represented by the Secretary of the Navy

[22] Filed: June 25, 1970

[21] Appl. No.: 49,705

[52] U.S. Cl. ..........................................331/94.5, 252/301.4
[51] Int. Cl. .............................................................H01s 3/16
[58] Field of Search..............................331/94.5; 252/301.4

[56] References Cited

OTHER PUBLICATIONS

Kischio, Zeitschrist Sur Naturforschung, Vol. 21a, No. 10, Oct. 1966, pp. 1733–1734.
Neumann, Physics Letters, Vol. 28a, No. 7, 13 Jan. 1969, pp. 491–492.
Bishop, et al., Applied Physics Letters, Vol. 15, No. 1, 1 July 1969, pp. 12–14.

Primary Examiner—Ronald L. Wibert
Assistant Examiner—R. J. Webster
Attorney—R. S. Sciascia, Arthur L. Branning and J. G. Murray

[57] ABSTRACT

A solid-state laser device is provided utilizing cadmium phosphide as the lasing element. At liquid helium temperature it produces coherent laser oscillation having wavelengths near 2.12 micron.

3 Claims, 3 Drawing Figures

CADMIUM PHOSPHIDE LASER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates generally to laser devices and more particularly to an improved solid-state laser device using cadmium phosphide as the lasing element.

2. Description of the Prior Art

In general, a laser includes an active material that will produce stimulated emission of radiation, an excitation source that pumps power into the active material, and a resonant structure or cavity.

The active material or lasing element of a laser has at least two energy levels, or atomic states, separated in energy by an amount corresponding to a characteristic output frequency. It is characterized by the properties that (1) its electrons may be excited into the higher of the two energy levels and thus an inverted population condition may be produced, and (2) when the electrons return to the lower energy level the active material emits light. The emitted light is such that, within the material, an incident photon triggers an excited region to emit a photon in phase with the incident photon. Thus, substantially all of the emitted light is in phase and is described as coherent light. The active material may be, a solid (for example, semiconductor materials), a gas (for example, helium-neon) or a liquid.

The excitation source that is used to excite the electrons into the higher energy level is referred to as a pumping source and may comprise an RF field; a light source, e.g., a xenon flash tube; a laser beam or other known types of energy sources.

The resonant structure, or resonant cavity, usually includes two light reflective surfaces, such as mirrors positioned at the ends of the active material. One of the light reflective surfaces normally has a portion which is partially transparent so that an output light may be obtained from the laser. The light reflective surfaces, or mirrors, are precisely oriented so that resonant modes will exist between the mirrors at frequencies for which the spacing between mirrors corresponds to a path length of an integral number of half wavelengths.

The coherence and high peak power of the laser emission affords many applications in all fields where high power impulses are required. Also, the directional capability of the beam can assure focusing upon an area in the order of 1 micron, a very important property which can be put to use in communications systems, metallurgy, chemistry, and surgery. In laser communication systems, it is especially advantageous to have a laser beam which will operate effectively through the atmosphere. Since the atmosphere is more transmissive for some wavelength ranges, i.e., "atmospheric windows," than others, it is desirable to employ as carrier radiation those for which the atmosphere is most transmissive. The wavelength range from $2\mu$ to $2.4\mu$ is one such "atmospheric window."

SUMMARY OF THE INVENTION

According to the present invention, there is provided a solid-state cadmium phosphide laser device for emitting coherent laser oscillation having wavelengths of about 2.1 micron at liquid helium temperatures. This represents the first observation of laser action in a group II-V semiconductor material.

OBJECTS OF THE INVENTION

It is an object of the present invention to provide a novel solid-state laser device.

It is a further object of the present invention to provide a novel solid-state laser device utilizing a group II-V semiconductor as the lasing element.

It is another object of the present invention to provide a solid-state laser device having a laser emission in the region of an "atmospheric window."

An additional object of the present invention is to utilize cadmium phosphide as a novel lasing element in a solid-state laser device.

Still other objects, features and attendant advantages of the present invention will become apparent to those skilled in the art from a reading of the following detailed description of preferred embodiments constructed in accordance therewith, taken in conjunction with the accompanying drawings wherein:

DESCRIPTION OF THE PREFERRED EMBODIMENTS

Figure 1:
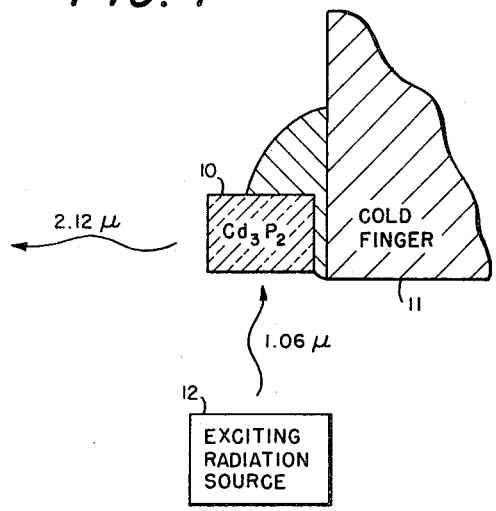
FIG. 1 is a schematic showing the basic components making up the laser device of this invention.

Referring now to the drawings and, more particularly, to FIG. 1 thereof, there is shown the basic components of the solid-state laser device of the present invention. The device consists of a lasing element 10, which in this invention is cadmium phosphide, mounted on a liquid helium-cooled cold finger 11. The lasing element may be secured to the cold finger by any suitable means such as solder (indium, is a preferred solder), adhesives, or mechanical means. Exciting radiation 12 may be provided optically, by a high energy electron beam, by injecting electron-hole pairs across a PN-junction, injecting through PNP- and NPN-structure, injection across heterojunction of Schottky barriers, or by any other methods known in the art for injecting semiconductors.

As a specific operating example of the embodiment shown in FIG. 1, the exciting radiation was provided by a Q-switched Nd-doped YAG laser operating at a wavelength of 1.06 microns with a pulse width of 0.2 $\mu$sec. and a repetition rate of 4,500 Hz. This optical radiation resulted in the well defined geometric mode structure shown by curves (b) and (c) in FIGS. 2 and 3. Referring now to the curves in FIG. 2, they illustrate the emission spectra resulting from irradiating a quasihexagonal cadmium phosphide lasing element with the above-described Nd-doped YAG laser operated at varying power intensities. Curve (a) represents the spontaneous emission spectra obtained at a pumping (or power) intensity below laser threshold. Curves (b) and (c) illustrate the development of defined laser mode structure when the power was increased above the threshold for laser action. This threshold typically occurred at power inputs of approximately $10^4$ W cm.$^{-2}$ and greater. If it is assumed that one electron-hole pair is created per absorbed photon, the threshold value corresponds to an effective current density of about 4,000 A. cm.$^{-2}$, after an approximate correction for the reflection from the $Cd_3P_2$ surface.

Figure 2:
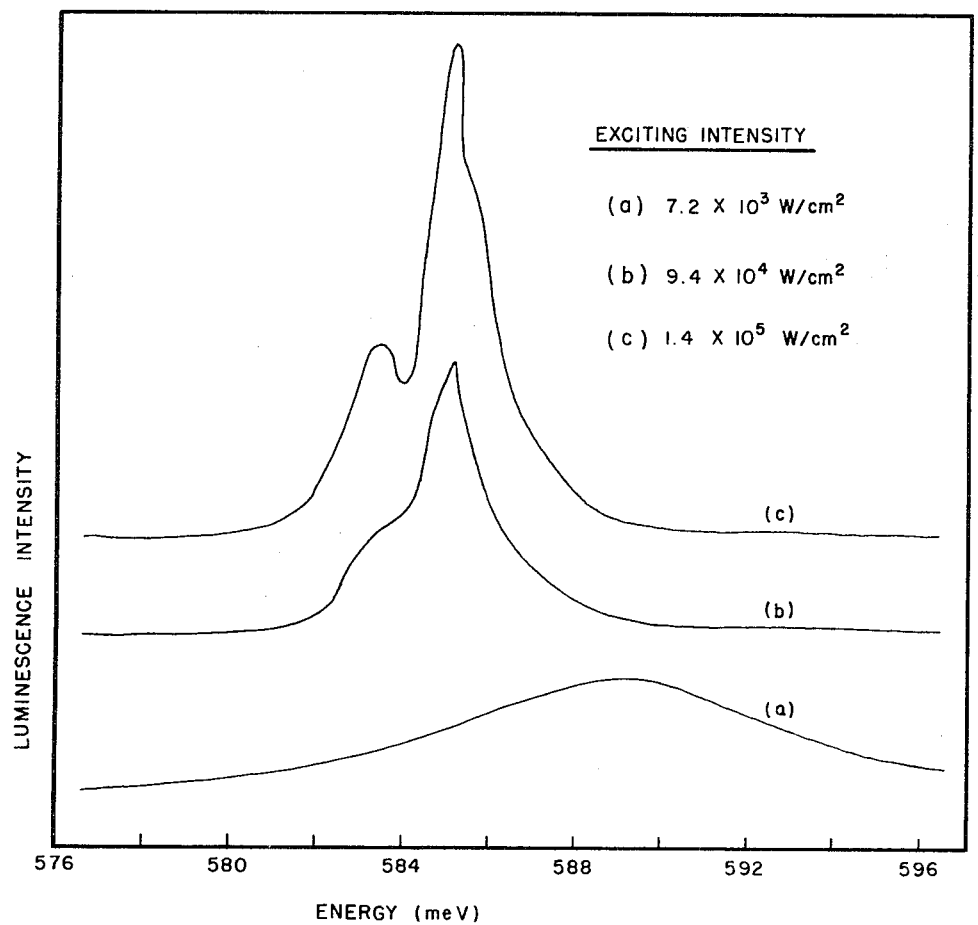
FIG. 2 is a graph showing the development of laser mode structure in quasihexagonal lasing elements of this invention.

Because of the hexagonal shape of the lasing element tested and reported in FIG. 2, it is difficult to determine the exact geometry of the resonant cavity due to the fact that there may be many resonant cavities in a polygonal structure. The most favorable geometry with which to achieve optically pumped laser action requires two plane parallel surfaces to establish the well-known Fabry-Perot cavity, and a third surface perpendicular to the two parallel surfaces, which is illuminated by the exciting (pumping) radiation. The area covered by the exciting laser beam is made greater than the separation of the parallel faces so that the active region extends throughout the length of the resonant cavity. As shown in FIG. 1, laser emission is observed in a direction perpendicular to the incident direction of the exciting light but parallel to the direction in which the laser oscillation is established.

Figure 3:
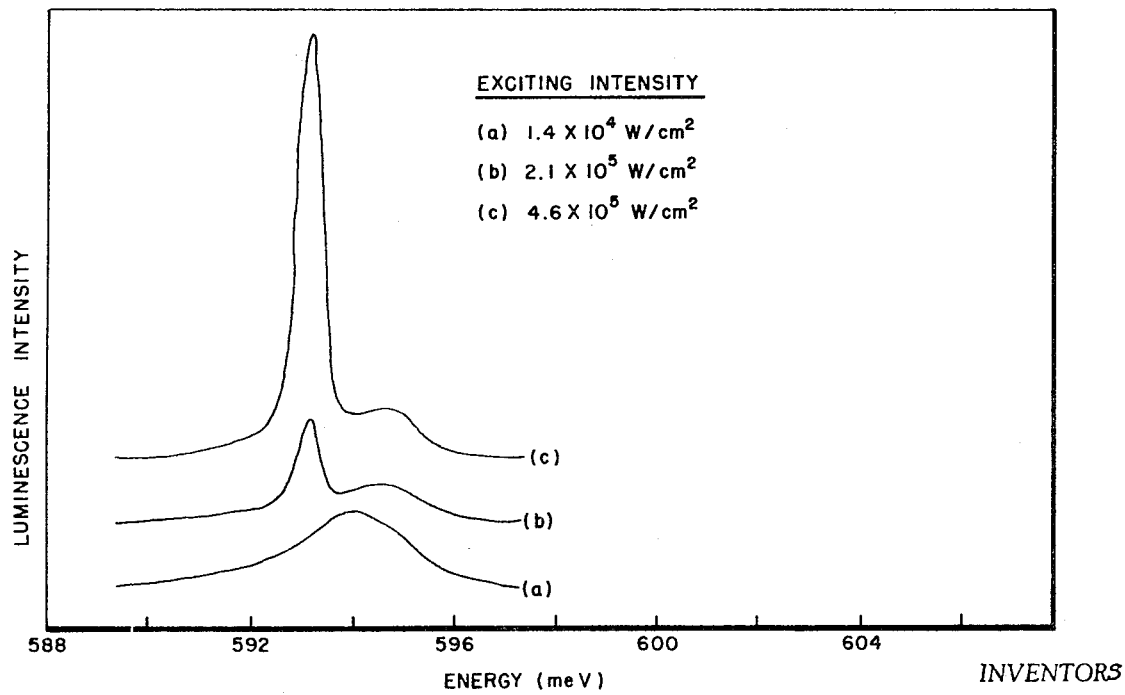
FIG. 3 is a graph showing the development of laser mode structure in rectangular lasing elements of this invention.

Curves (a) (b) and (c) of FIG. 3 show the development, with increasing pump intensity, of a single-laser mode in photoluminescence spectra obtained from the rectangular lasing element of FIG. 1. Since the region of inverted population extends throughout the length of the resonant cavity in the case of the rectangular element, the laser action is not restricted to the spectral range of crystal transparency, but can occur at somewhat higher energies than those observed for the hexagonal elements.

The lasing element described by the specific embodiments of the present invention were as-grown crystals of cadmium phosphide produced by the sublimation growth technique described by Haacke and Castellion. J. Appl. Phys. 35, 2484 (1964). The sublimation technique produces N-type crystals of $Cd_3P_2$ with a donor impurity level of $10^{18}$ cm.$^{-3}$, or less, and an electron mobility of approximately $9 \times 10^3$ cm.$^2$/v. sec., at 77° K. It should be understood, of course, that this invention is not limited to any particular lasing element configuration or geometry and any configuration which will achieve a resonant cavity is suitable. Also, the $Cd_3P_2$ lasing element is suitable for use with all types of externally arranged resonant cavities and modulation systems well known in the art.

The use of cadmium phosphide with its 0.6 ev. energy gap and 2.1 micron laser emission is unique among simple two constituent compound semiconductors. It represents the first laser action produced in any of the compound semiconductors comprising combinations of group II–V elements. Additionally, its 2.12 micron wavelength laser emission places it conveniently in the region of atmospheric transparency which lies between 2.0 and 2.4 microns.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. In a device for generating coherent radiation comprising a single-crystal body, means including a source of radiation for exciting said body and means for deriving coherent laser radiation from said body; wherein the improvement comprises cadmium phosphide as said crystal body.

2. The device as recited in claim 1, wherein said excitation source comprises optical pumping means.

3. The device as recited in claim 1, including means for cooling said lasing element below ambient temperature.

* * * * *